(12) United States Patent
Smith et al.

(10) Patent No.: US 7,041,353 B2
(45) Date of Patent: May 9, 2006

(54) INSULATION BATT AND PACKAGE

(75) Inventors: John Brooks Smith, Littleton, CO (US); Blake Boyd Bogrett, Littleton, CO (US); Dennis Robert Larratt, Littleton, CO (US); Larry J. Weinstein, Littleton, CO (US); Robert J. Allwein, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 456 days.

(21) Appl. No.: 09/945,202

(22) Filed: Aug. 31, 2001

(65) Prior Publication Data

US 2002/0136854 A1 Sep. 26, 2002

Related U.S. Application Data

(60) Provisional application No. 60/277,574, filed on Mar. 21, 2001.

(51) Int. Cl.
*B65D 65/28* (2006.01)
(52) U.S. Cl. ............................ 428/43; 428/76; 428/113
(58) Field of Classification Search .................. 428/76, 428/113, 43, 46
See application file for complete search history.

(56) References Cited

U.S. PATENT DOCUMENTS

| | | | | |
|---|---|---|---|---|
| 5,350,063 A | * | 9/1994 | Berdan, II | 206/321 |
| 5,817,387 A | * | 10/1998 | Allwein et al. | 428/43 |
| 6,042,911 A | * | 3/2000 | Berdan, II | 428/36.3 |
| 6,165,305 A | * | 12/2000 | Weinstein et al. | 156/257 |

* cited by examiner

*Primary Examiner*—Patrick Joseph Ryan
*Assistant Examiner*—Jane Rhee
(74) *Attorney, Agent, or Firm*—Robert D. Touslee; Timothy G. Hofmeyer

(57) ABSTRACT

An insulation package contains a plurality of unfaced or faced, uncut and pre-cut fibrous insulation batts of a preselected width enveloped within a covering in a compressed condition. Each of the pre-cut fibrous insulation batts has a plurality of longitudinally extending batt sections separably joined to adjacent batt sections by separable connectors. The separable connectors hold the pre-cut fibrous insulation batt together for handling but can be separated along the lengths of the batt sections by hand to separate adjacent batt sections. Preferably, between 20% and 70% of the fibrous insulation batts in each of the insulation packages are pre-cut fibrous insulation batts.

32 Claims, 6 Drawing Sheets

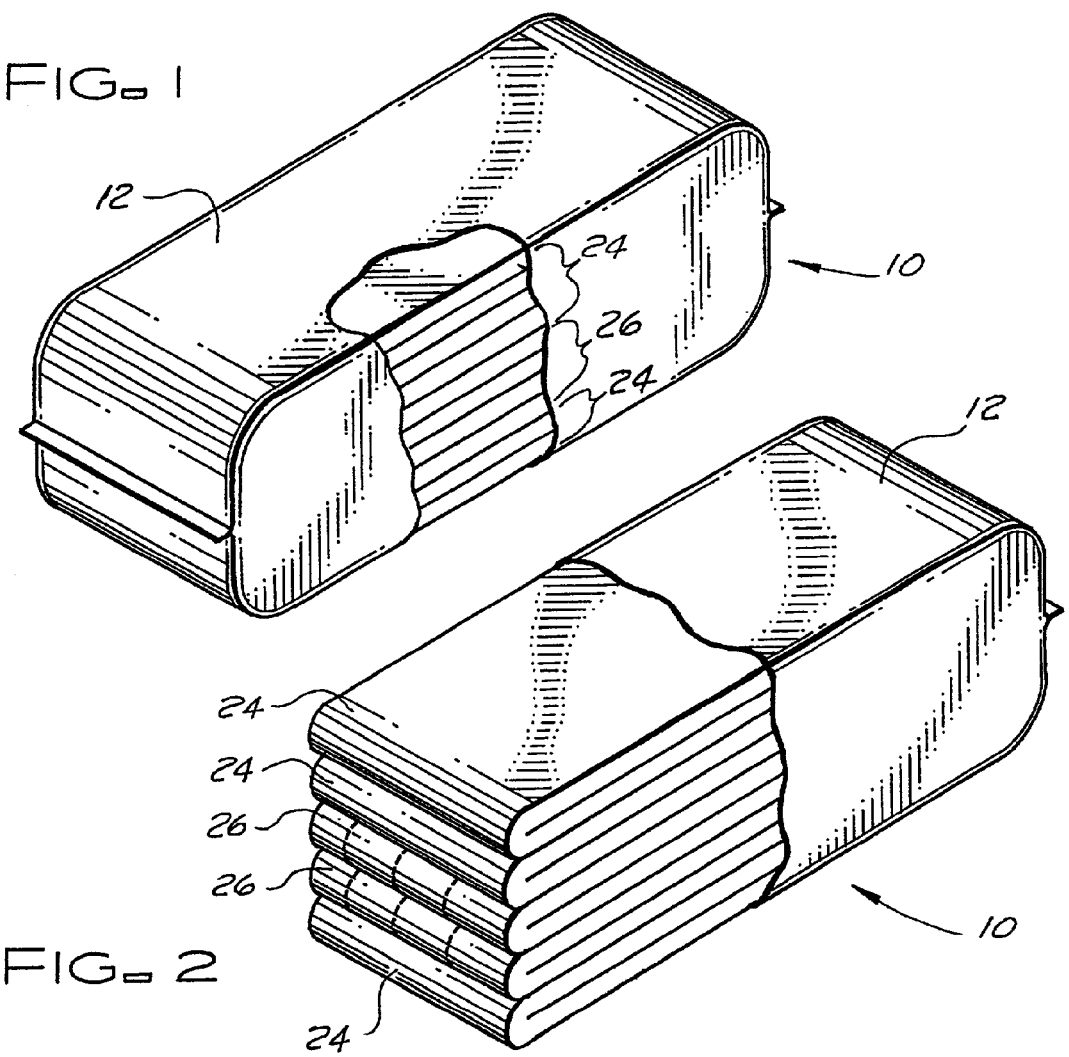
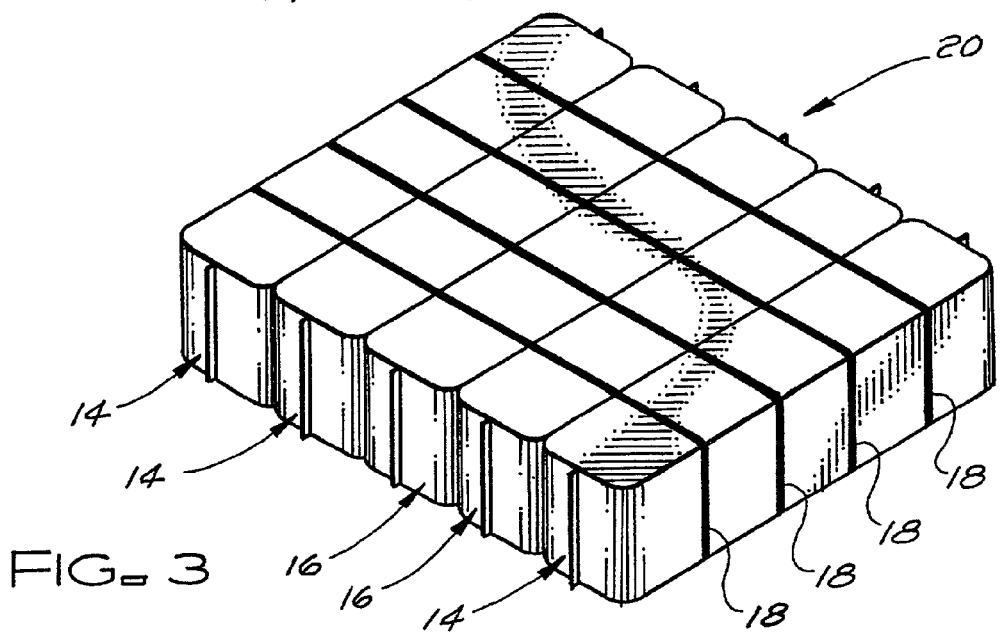

| PIECE | FITS CAVITIES |
|---|---|
| 2-1/2" | UP TO 2" |
| 4-1/2" | 2-1/2" TO 4" |
| 6-1/2" | 4-1/2" TO 6" |
| 8-1/2" | 6-1/2" TO 8" |
| 10-1/2" | 8-1/2" TO 10" |
| 12-1/2" | 10-1/2" TO 12" |
| 15" | 12-1/2" TO 14-1/2" |

| PIECE | FITS CAVITIES |
|---|---|
| 3" | UP TO 2-1/2" |
| 5" | 3" TO 4-1/2" |
| 7" | 5" TO 6-1/2" |
| 9" | 7" TO 8-1/2" |
| 11" | 9" TO 10-1/2" |
| 12" | 11" TO 11-1/2" |
| 14" | 12" TO 13-1/2" |
| 16" | 14" TO 15-1/2" |
| 18" | 16" TO 17-1/2" |
| 20" | 18" TO 19-1/2" |
| 23" | 20" TO 22-1/2" |

INSULATION BATT AND PACKAGE

This patent application is a continuation-in-part of provisional patent application Ser. No. 60/277,574 filed Mar. 21, 2001.

BACKGROUND OF THE INVENTION

The present invention relates to insulation batts and an insulation package containing compressed, faced or unfaced fibrous insulation batts, and, in particular, pre-cut insulation batts and to an insulation package containing compressed, faced or unfaced, uncut and pre-cut fibrous insulation batts for use in the insulation of standard width and non-standard width wall, ceiling, floor and roof cavities.

Building structures, such as residential houses, industrial buildings, office buildings, mobile homes, prefabricated buildings and similar structures typically include walls (both interior and exterior), ceilings, floors and roofs which are insulated for both thermal and acoustical purposes, especially exterior walls, the ceilings below open attic spaces, and the roofs of such structures. The walls, ceilings, floors and roofs of these structures include framing members, e.g. studs, rafters, floor and ceiling joists, beams and similar support or structural members, which are normally spaced-apart standard distances established by the building industry. Sheathing, paneling, lathing or similar construction materials are secured to these framing members to form the walls, ceilings, floors and roofs of the structures. While the contractor seeks to maintain the spacing of such framing members in these structures at these standard distances for ease of construction and the insulation of the elongated cavities formed in these walls, ceilings, floors and roofs, frequently, the walls, ceilings, floors and roofs of these structures include elongated cavities defined, at least in part, by successive or adjacent framing members which are spaced apart a nonstandard distance less than the standard distance between framing members. Studies have shown that nonstandard width wall cavities can be as high as 60% of the wall cavities in a building and that the percentage by square foot of wall area made up of nonstandard wall cavities can range from about 20% to about 55% of the wall area of the building. Thus, there has been a need for providing contractors with insulation batts that can be quickly and easily installed in a structure to insulate both standard and non-standard width cavities without the need to cut the insulation batts with a knife or other cutting tool to fit the nonstandard width cavities and a need to package uncut and precut insulation batts so that an insulation contractor does not have to unnecessarily stock, load, haul, and unload additional insulation packages and work with additional insulation packages at a job site.

SUMMARY OF THE INVENTION

The resilient fibrous insulation batts and the insulation package of the present invention solve the above problems by providing insulation contractors with an insulation package that contains a plurality of uncut and pre-cut resilient fibrous insulation batts so that the contractor can quickly and easily insulate both standard (e.g. fourteen and one half inch and twenty two and one half inch wide cavities) and non-standard width wall, ceiling, floor and roof cavities without having to cut the insulation batts with knives or other cutting tools to size the batts to the nonstandard width wall cavities and without having to unnecessarily handle additional insulation packages. The resilient fibrous insulation batts within the insulation package of the present invention may be faced or unfaced fibrous insulation batts of a pre-selected width (e.g. fifteen inches or twenty three inches), which, preferably, are in a compressed condition. While an insulation package could contain 100% pre-cut resilient fibrous insulation batts, preferably, between 20% and 70% of the resilient fibrous insulation batts in the insulation package are pre-cut resilient fibrous insulation batts and between 30% and 80% of the resilient fibrous insulation batts in the insulation package are uncut resilient fibrous insulation batts. Each of the pre-cut resilient fibrous insulation batts has a plurality of longitudinally extending batt sections separably joined to adjacent batt sections by separable connectors. These separable connectors hold the pre-cut resilient fibrous insulation batt together for handling, but can be easily separated along the lengths of the batt sections by hand to separate one or more of the batt sections from the remainder of the batt sections in the pre-cut resilient fibrous insulation batt. With this structure, a pre-cut resilient fibrous insulation batt can be handled as a unit for insulating a cavity having a width about equal to the width of the pre-cut resilient fibrous insulation batt or easily separated by hand into one or more batt sections at the separable connectors to insulate a cavity having a lesser width. Since the preferred insulation package of the present invention contains between 20% and 70% pre-cut resilient fibrous insulation batts and between 30% and 80% of the resilient fibrous insulation batts, an insulation contractor using the insulation packages of the present invention to insulate a building can quickly and easily insulate both the standard and non standard width cavities of the building without having to cut the insulation batts longitudinally to size the batts for cavities of less than a standard cavity width.

Preferably, the batt sections of the pre-cut resilient fibrous insulation batts of the present invention are sized in width so that one or more sections can be separated from the remainder of the batt sections in the pre-cut resilient fibrous insulation batt to form a resilient integral batt having any of a series of selected different widths, from a smallest width of about 1½ to about 3 inches up to a greater width about 1½ to about 3 inches less than the original width of the pre-cut resilient fibrous insulation batt, with the series of selected different widths being in increments that are between about 1 and about 4 inches in width. Preferably, the widths of the selected series of widths for the integral batt formed from the pre-cut fibrous insulation batt predominately differ in width from each other in about 1 to about 2 inch increments. Where the batts are faced, the facings are separable intermediate adjacent batt sections along the lengths of the batt sections and are provided with tabs, intermediate the adjacent batt sections, which extend along the lengths of the batt sections for securing the batt sections in place when the batt sections are installed. Preferably, the cuts in the pre-cut resilient fibrous insulation batt of the present invention, which either partially or fully sever the pre-cut fibrous insulation batt of the present invention to form the batt sections, are closed so that the cuts do no provide thermal bridges through the batt.

BRIEF DESCRIPTION OF THE DRAWINGS

FIG. 1 is a schematic perspective view, with a portion broken away, of an insulation package of the present invention containing uncut and pre-cut resilient fibrous insulation batts.

FIG. 2 is another schematic perspective view of the insulation package of the present invention with a portion broken away to better show a preferred arrangement for the uncut and pre-cut resilient fibrous insulation batts within the package.

FIG. 3 is a schematic perspective view of a unitized package of the present invention containing packages of uncut and pre-cut resilient fibrous insulation batts.

DESCRIPTION OF THE PREFERRED EMBODIMENT

Figure 4:
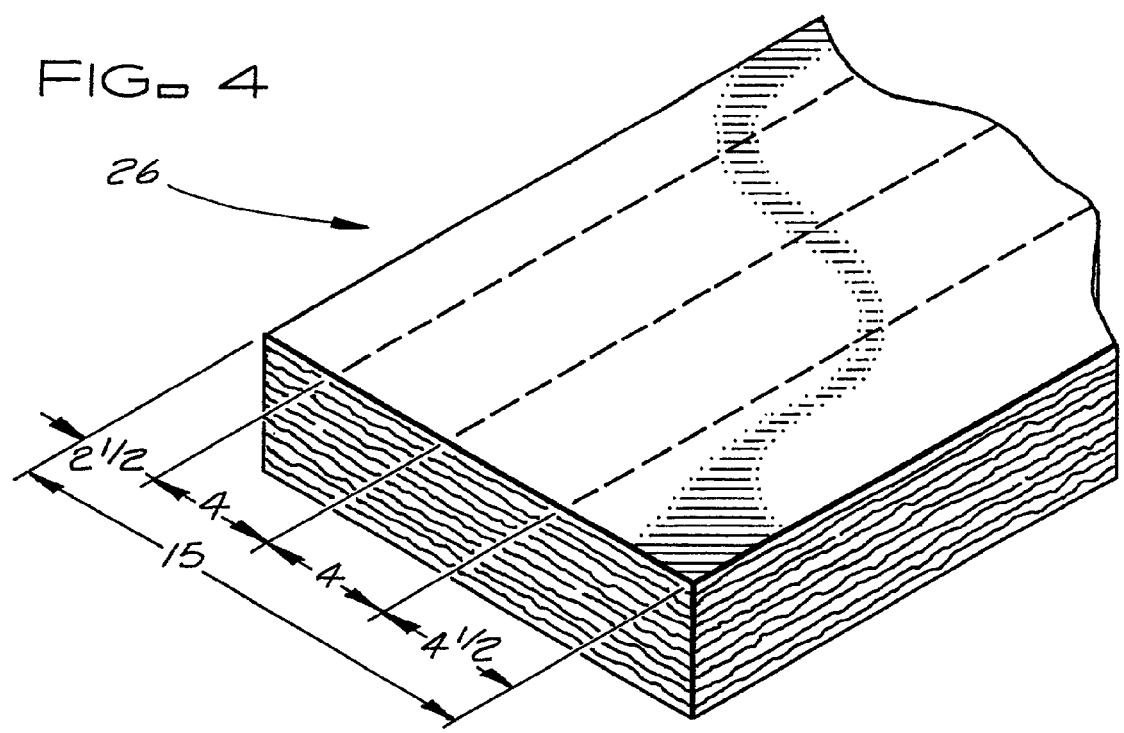
FIG. 4 is a schematic perspective view of a first pre-cut fibrous insulation batt of the present invention having four batt sections of preferred widths.

FIGS. 1 and 2 show an insulation package 10 of the present invention that contains a plurality of resilient fibrous insulation batts in a stack. The insulation package has a covering 12, e.g. a pliant polymeric film or Kraft paper covering, which surrounds and encloses or envelops the stack of resilient fibrous insulation batts e.g. a sleeve formed from two sheets of polymeric film sealed along the sides and ends of the package, a seamless tubular sheet of polymeric film open or sealed at one or both ends of the package, or other conventional enveloping coverings used in the industry. Preferably, the resilient fibrous insulation batts within the insulation package 10 are compressed in a direction perpendicular to the major surfaces of the insulation batts to reduce the batts in thickness (e.g. compressed to about ⅕ to about ⅛ of the batts normal uncompressed thickness) and, thus, the volume of the insulation package for shipping and handling. The resilient fibrous insulation batts contained within the insulation package 10 include unfaced uncut resilient fibrous insulation batts 24 (as shown) or faced uncut resilient fibrous insulation batts (not shown) and unfaced pre-cut resilient fibrous insulation batts 26 (as shown) or faced pre-cut resilient fibrous insulation batts (not shown) of a pre-selected length, width and thickness.

While the faced or unfaced pre-cut resilient fibrous insulation batts may be placed anywhere within the package 10, preferably, the faced or unfaced pre-cut resilient fibrous insulation batts are centrally located within the package, such as but not limited to as shown in FIG. 2, with one or more faced or unfaced uncut resilient fibrous insulation batts on both sides of the faced or unfaced pre-cut resilient fibrous insulation batts to help prevent damage to the faced or unfaced pre-cut resilient fibrous insulation batts due to packaging, handling or shipping. Preferably, the insulation package 10 contains between 30% and 80% faced or unfaced uncut resilient fibrous insulation batts and between 20% and 70% faced or unfaced pre-cut resilient fibrous insulation batts (the insulation package 10 shown in FIG. 2 contains 60% unfaced uncut resilient fibrous insulation batts and 40% unfaced pre-cut resilient fibrous insulation batts 26). While the insulation package 10 shown contains a total of five resilient fibrous insulation batts, the number of resilient fibrous insulation batts contained within the insulation package 10 may vary e.g. from 3 to 32 or more batts in a package.

As shown in FIG. 3, a plurality of insulation packages 14 and 16, which each contain a plurality of resilient fibrous insulation batts, are bound together with bands or straps 18 to form a unitized insulation package 20. Each insulation package 14 and 16 has a covering, e.g. a pliant polymeric film or Kraft paper covering, which surrounds and encloses or envelops the plurality of resilient fibrous insulation batts e.g. a sleeve formed from two sheets of polymeric film sealed along the sides and ends of the package, a seamless tubular sheet of polymeric film open or sealed at one or both ends of the package, or other conventional enveloping coverings used in the industry. Preferably, the resilient fibrous insulation batts within the insulation packages 14 and 16 are compressed in a direction perpendicular to the major surfaces of the insulation batts to reduce the batts in thickness (e.g. compressed to about ⅕ to about ⅛ of the batts normal uncompressed thickness) and, thus, the volume of the insulation packages 14 and 16 for shipping and handling. The resilient fibrous insulation batts contained within the insulation packages 14 are unfaced uncut resilient fibrous insulation batts or faced uncut resilient fibrous insulation batts of a pre-selected length, width and thickness. The resilient fibrous insulation batts in the insulation packages 16 are unfaced pre-cut resilient fibrous insulation batts or faced pre-cut resilient fibrous insulation batts of the same pre-selected length, width and thickness as the unfaced or faced uncut resilient fibrous insulation batts in the packages 14.

As shown, the unitized package 20 contains five insulation packages that normally each contain the same number of resilient fibrous insulation batts. Three of the insulation packages contained within the unitized package 20 are insulation packages 14 containing only faced or unfaced uncut resilient fibrous insulation batts and two of the insulation packages contained within the unitized package 20 are insulation packages 16 containing only faced or unfaced pre-cut resilient fibrous insulation batts of the present invention. Preferably, the unitized package 20 contains between 30% and 80% faced or unfaced uncut resilient fibrous insulation batts and between 20% and 70% faced or unfaced pre-cut fibrous insulation batts. While the unitized package 20 shown in FIG. 3 contains five insulation packages, the number of insulation packages in the unitized package 20 may vary provided the package does not become to large to easily handled. It is also contemplated that a unitized package 20 could be made with a plurality of insulation packages 10 wherein each package 10 includes both pre-cut and uncut resilient fibrous insulation batts.

The width of the resilient fibrous insulation batts within the insulation packages 10 and 20 is typically pre-selected to insulate a wall, floor, ceiling or roof cavity having a standard building cavity width e.g. a wall cavity about fourteen and one half or about twenty-two and one half inches wide or a floor cavity about fourteen and one half, about nineteen or about twenty two and one half inches wide. The pre-cut resilient fibrous insulation batts of the present invention each include a plurality of longitudinally extending batt sections separably joined to adjacent batt sections of the pre-cut resilient fibrous insulation batt by separable connectors. With this structure, the pre-cut resilient fibrous insulation batt can be handled as a unit for insulating a cavity having a width about equal to the width of the pre-cut resilient fibrous insulation batt or easily separated by hand (without the need to use a knife or other cutting implement) into one or more batt sections at the separable connectors to form an integral batt for insulating a cavity having a lesser width. Preferably, the batt sections of the pre-cut resilient fibrous insulation batts of the present invention are sized in width so that one or more sections can be separated from the remainder of the batt sections in the pre-cut resilient fibrous insulation batt to form a resilient integral batt having any of a series of selected different widths, from a smallest width of about 1½ to about 3 inches up to a greater width about 1½ to about 3 inches less than the original width of the pre-cut resilient fibrous insulation batt, with the series of selected different widths being in increments that are between about 1 and 4 inches in width. Preferably, the widths of the selected series of widths for the integral batt formed from the pre-cut fibrous insulation batt predominately differ in width from each other in about 1 to about 2 inch increments and one or more sections can be separated from the pre-cut resilient fibrous insulation batt to form an integral batt having a width about one half of the width of the pre-cut resilient fibrous insulation batt e.g. an integral batt about 6½ or about 8½ inches wide may be formed from a 15 inch wide pre-cut resilient fibrous insulation batt and an integral batt about 11½ or about 12 inches wide may be formed from a 23 inch wide pre-cut resilient fibrous insulation batt.

While the faced and unfaced, uncut and pre-cut, resilient fibrous insulation batts of the present invention may be made of other fibrous materials, preferably, the unfaced and faced, uncut and pre-cut fibrous insulation batts of the present invention are made of randomly oriented, entangled, glass fibers and typically have a density between about 0.4 pounds/ft$^3$ and about 1.5 pounds/ft$^3$. The fibrous insulation materials used to form the pre-cut resilient fibrous insulation batts of the present invention, whether made of glass or other fibers, are sufficiently resilient to close longitudinally extending cuts (partial cuts) or, if used, transversely extending cuts (partial cuts) made in the fibrous insulation batt that both: a) divide the batt into longitudinally extending batt sections of selected widths and lengths; and b) by not completely severing the batt between adjacent batt sections, form separable connectors within the batt separably joining adjacent batt sections. With this structure, the cuts in the pre-cut resilient fibrous insulation batts of the present invention do not form thermal bridges in the direction of the thickness of the batt (perpendicular to the major surfaces of the batt) that would adversely affect the thermal and/or acoustical performance or properties of the pre-cut resilient fibrous insulation batt. Where the batt sections are formed in the pre-cut resilient fibrous insulation batt of the present invention by cuts that completely sever the batt between adjacent batt sections and the separable connectors separably joining adjacent batt sections of the pre-cut resilient fibrous insulation batt are formed from a facing sheet or sheets bonded to one or both of the major surfaces of the batt or an adhesive between abutting sides of the batt sections that separably join the adjacent batt sections together, the resilience of the pre-cut resilient fibrous insulation batt also helps to prevent the formation of thermal bridges within the batt in the direction of the thickness of the batt. Examples of other fibers that may be used to form the uncut and pre-cut, unfaced and faced resilient insulation batts of the present invention are mineral fibers, such as but not limited to, rock wool fibers, slag fibers, and basalt fibers, and organic fibers such as but not limited to polypropylene, polyester and other polymeric fibers. The fibers in the uncut and pre-cut, unfaced and faced resilient insulation batts of the present invention may be bonded together for increased integrity, e.g. by a binder at their points of intersection such as but not limited to urea phenol formaldehyde or other suitable bonding materials, or the uncut and pre-cut, unfaced and faced resilient fibrous insulation batts of the present invention may be binder-less provided the batts possess the required integrity.

As stated above, due to their resilience, the preferred uncut and pre-cut fibrous insulation batts of the insulation package of the present invention can be compressed to reduce the batts in thickness for packaging. When the uncut and pre-cut fibrous insulation batts are removed from the insulation package, the batts recover to substantially their pre-compressed thickness. The resilience of the uncut and pre-cut fibrous insulation batts provides another benefit. After an uncut or pre-cut fibrous insulation batt or one or more sections of a pre-cut fibrous insulation batt is compressed in width and inserted into a cavity having a width somewhat less than the width of the uncut or pre-cut fibrous insulation batt or section(s) of pre-cut fibrous insulation batt, the insulation batt or section(s) of the insulation batt will expand to the width of the cavity and press against the sides of the cavity to hold or help hold the fibrous insulation batt or section(s) of the fibrous insulation batt in place.

For most applications, such as walls in residential houses, the resilient, unfaced or faced, uncut and pre-cut resilient fibrous insulation batts of the present invention are about forty six to about forty eight to fifty nine inches in length, e.g. about forty eight inches, or eighty eight to about one hundred seventeen inches in length, e.g. about ninety three inches in length. Typically, the widths of the unfaced and faced, uncut and pre-cut resilient fibrous insulation batts are substantially equal to or somewhat greater than standard cavity width of the cavities to be insulated, for example: about eleven inches in width for a cavity where the center to center spacing of the wall, floor, ceiling or roof framing members is about twelve inches (the cavity having a width of about ten and one half inches); about fifteen inches in width for a cavity where the center to center spacing of the wall, floor, ceiling or roof framing members is about sixteen inches (the cavity having a width of about fourteen and one half inches); about nineteen inches in width for a cavity where the center to center spacing of the wall, floor, ceiling or roof framing members is about nineteen and one quarter inches (the cavity having a width of about seventeen and three quarter inches); and about twenty three inches in width for a cavity where the center to center spacing of the wall, floor, ceiling or roof framing members is about twenty four inches (the cavity having a width of about twenty two and one half inches). However, for other applications, the uncut and the pre-cut resilient fibrous insulation batts may have different initial widths, such as but not limited to about thirteen to about thirteen and one half inches.

Figure 5:
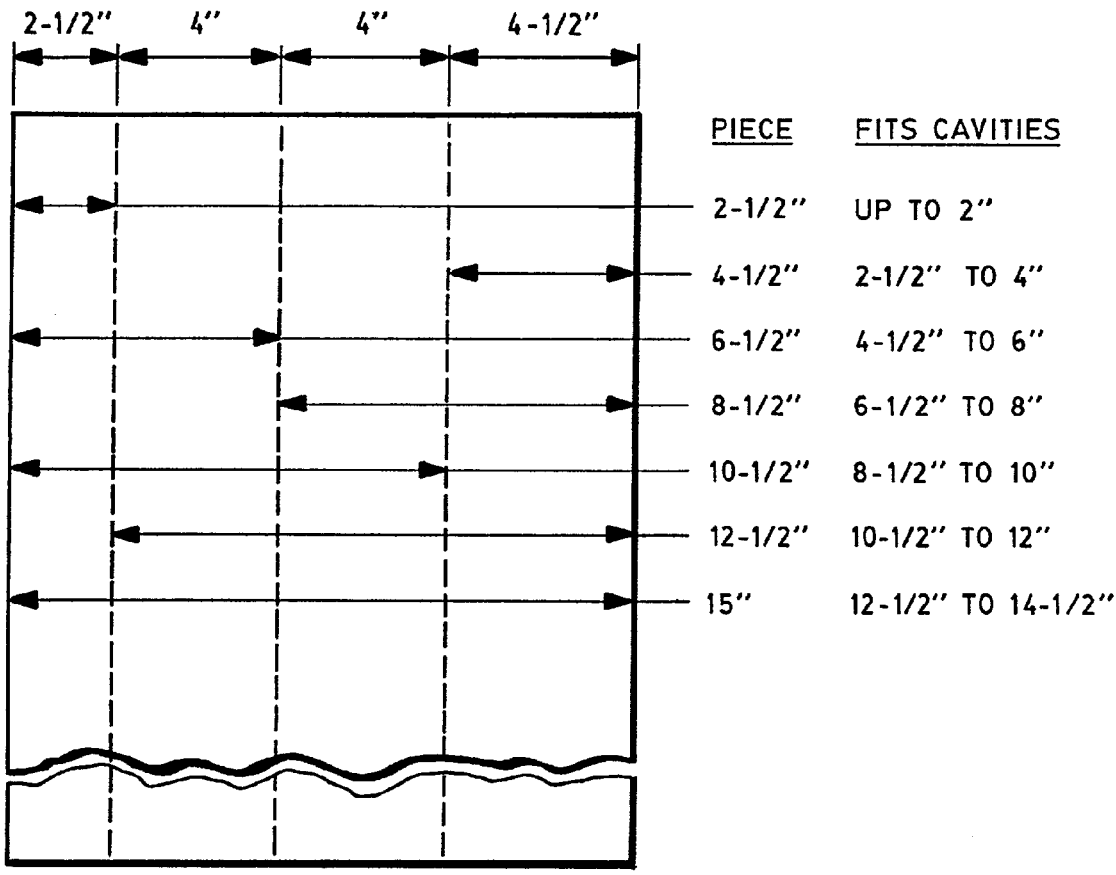
FIG. 5 is a diagram illustrating different widths for integral batts that can be formed from the pre-cut resilient fibrous insulation batt of FIG. 4 by separating different batt sections from the remainder of the pre-cut resilient fibrous insulation batt.
Figure 6:
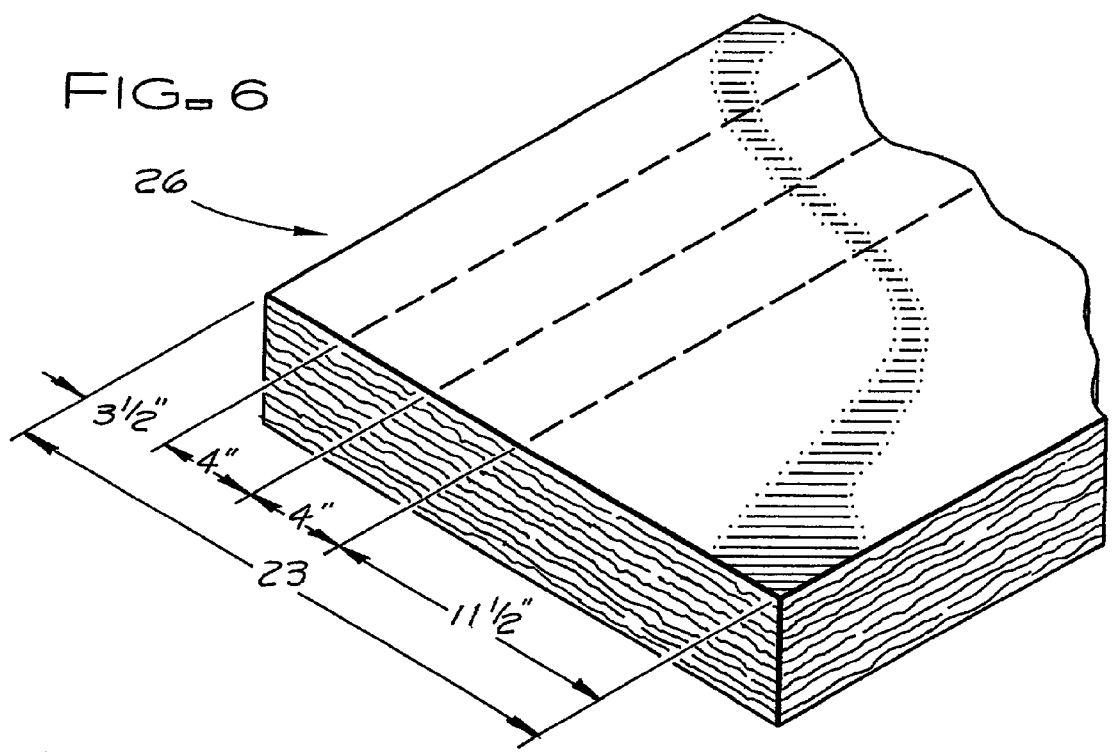
FIG. 6 is a schematic perspective view of a second pre-cut fibrous insulation batt of the present invention having four batt sections of preferred widths.
Figures 8, 9:
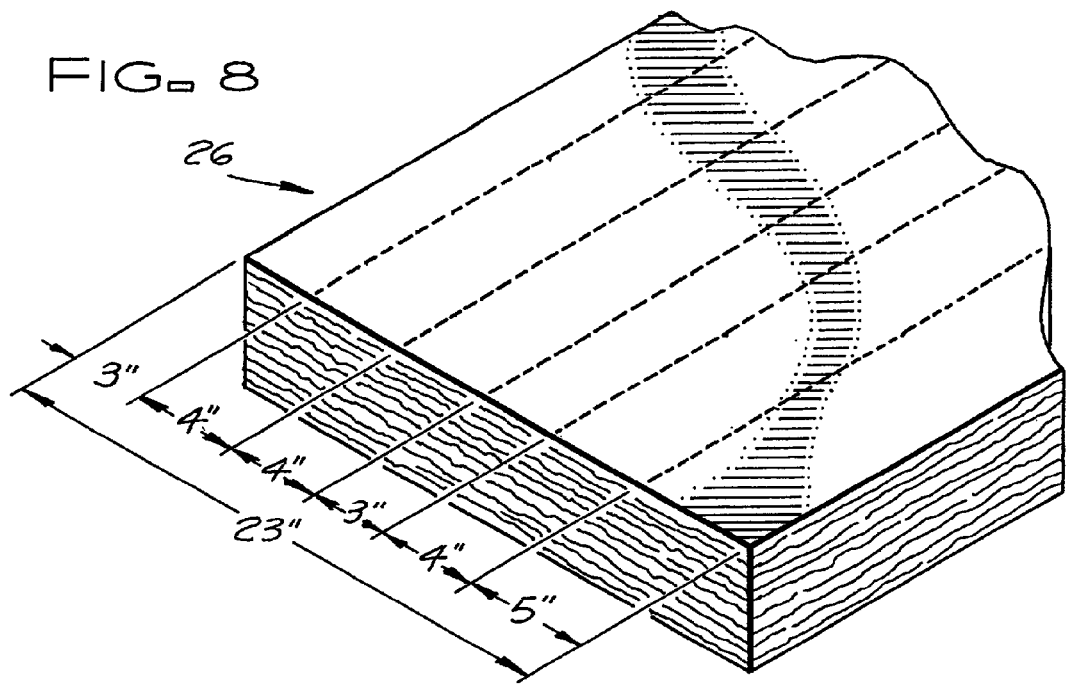
FIG. 8 is a schematic perspective view of a third pre-cut fibrous insulation batt of the present invention having six batt sections of preferred widths.
FIG. 9 is a diagram illustrating different widths for integral batts that can be formed from the pre-cut resilient fibrous insulation batt of FIG. 8 by separating different batt sections from the remainder of the pre-cut resilient fibrous insulation batt.

While only unfaced batts are shown in FIGS. 4, 6 and 8, the following examples illustrate how one or more batt sections of the unfaced or faced pre-cut resilient fibrous insulation batts of the present invention may be separated from the pre-cut resilient fibrous insulation batt of the present invention to form resilient integral batts, held together by separable connectors, of lesser widths than the pre-cut resilient fibrous insulation batt. Preferably, for a faced or unfaced pre-cut resilient fibrous insulation batt having a width of about fifteen inches that is divided into three batt sections, the batt sections are about three and one half, about five, and about six and one half inches in width (from left to right or right to left). For a faced or unfaced pre-cut resilient fibrous insulation batt having a width of about fifteen inches that is divided into four batt sections, the batt sections may be about three and one half, about four and one half, about five and one half, and about one and one half inches in width (from left to right or right to left). However, preferably, for a faced or unfaced pre-cut resilient fibrous insulation batt having a width of about fifteen inches that is divided into four batt sections, the batt sections are about two and one half, about four, about four, and about four and one half inches in width (from left to right or right to left). FIG. 4 schematically shows a pre-cut fibrous insulation batt 26 having a width of about fifteen inches that is divided into four batt sections of the preferred width. The diagram of FIG. 5 shows how the pre-cut fibrous insulation batt of FIG. 4 can be separated into batt sections to fit and insulate cavities of different widths. The two and one half inch batt section may be used to insulate a cavity up to about two inches in width; the four and one half inch batt section may be used to insulate a cavity from about two and one half to about four inches in width; the adjacent two and one half and the four inch wide batt sections, together, may be used to insulate a cavity from about four and one half to about six inches in width; the adjacent four inch and the four and one half inch wide batt sections, together, may be used to insulate a cavity from about six and one half to about eight inches in width; the two and one half and both four inch wide batt sections, together, may be used to insulate a cavity from about eight and one half to about ten inches in width; both four inch and the four and one half inch wide batt sections may be used to insulate a cavity from about ten and one half to about twelve inches in width; and the entire batt ,as a unit, may be used to insulate a cavity having a width from about twelve and one half to about fourteen and one half inches in width.

Figure 7:
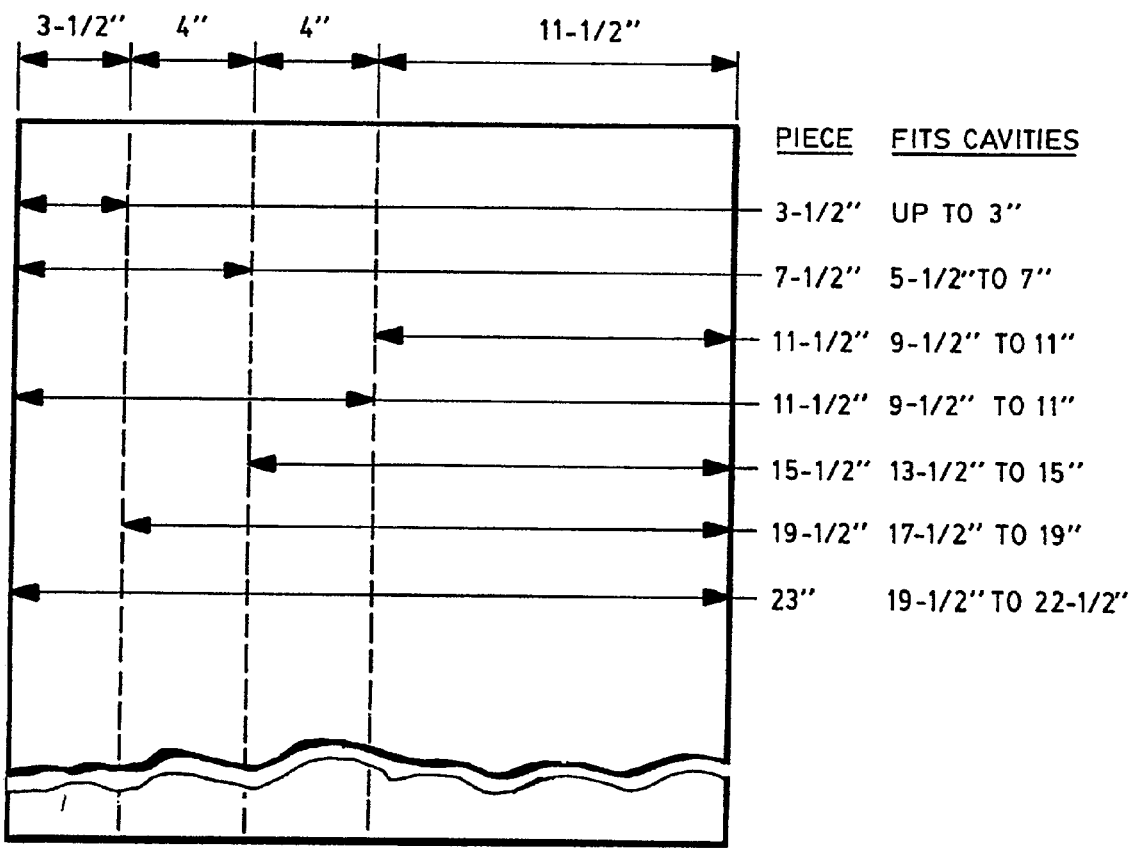
FIG. 7 is a diagram illustrating different widths for integral batts that can be formed from the pre-cut resilient fibrous insulation batt of FIG. 6 by separating different batt sections from the remainder of the pre-cut resilient fibrous insulation batt.

For a faced or unfaced pre-cut resilient fibrous insulation batt of the present invention having a width of about twenty three inches which is divided into four batt sections, preferably, the batt sections are about three and one half, about four, about four and about eleven and one half inches wide (from left to right or right to left). FIG. 6 schematically shows a pre-cut fibrous insulation batt 26 having a width of about twenty-three inches that is divided into four sections of the preferred width. The diagram of FIG. 7 shows how the pre-cut resilient fibrous insulation batt of FIG. 6 can be separated into batt sections to fit and insulate cavities of different widths. The three and one half inch batt section may be used to insulate a cavity up to about three inches in width; the eleven and one half inch batt section may be used to insulate a cavity from about nine and one half to about eleven inches in width; the adjacent three and one half and the four inch wide batt sections, together, may be used to insulate a cavity from about five and one half to about seven inches in width; the adjacent four inch and the eleven and one half inch wide batt sections, together, may be used to insulate a cavity from about thirteen and one half to about fifteen inches in width; the three and one half and both four inch wide batt sections, together, may be used to insulate a cavity from about nine and one half to about eleven inches in width; both four inch and the eleven and one half inch wide batt sections may be used to insulate a cavity from about seventeen and one half to about nineteen inches in width; and the entire batt as a unit, may be used to insulate a cavity having a width from about nineteen and one half to about twenty two and one half inches in width. It should also be noted that the pre-cut resilient fibrous insulation batt of FIG. 6 could be separated at its middle into two eleven and one half inch wide batts.

For a faced or unfaced pre-cut resilient fibrous insulation batt of the present invention having a width of about twenty-three inches which is divided into six batt sections, preferably, the batt sections are about three, about four, about four, about three, about four and about five inches wide (from left to right or right to left). FIG. 8 schematically shows a pre-cut resilient fibrous insulation batt 26 having a width of about twenty-three inches that is divided into six batt sections of the preferred width. The diagram of FIG. 9 shows how the pre-cut resilient fibrous insulation batt of FIG. 8 can be separated into batt sections to fit and insulate cavities of different widths. The three inch batt section may be used to insulate a cavity up to about two and one half inches in width; the five inch batt section may be used to insulate a cavity from about three to about four and one half inches in width; the three inch wide batt section and the four inch wide batt section, together, may be used to insulate a cavity from about five to about six and one half inches in width; the four inch wide batt section and the five inch wide batt section, together, may be used to insulate a cavity from about seven to about eight and one half inches in width; the three inch wide and the two adjacent four inch wide batt sections, together, may be used to insulate a cavity from about nine to about ten and one half inches in width; the adjacent three, four and five inch wide batt sections may be used to insulate a cavity from about eleven to about eleven and one half inches in width; the adjacent three, four, four and three inch wide batt sections may be used to insulate a cavity from about twelve to about thirteen and one inches in width; the adjacent four, three, four and five inch wide batt sections may be used to insulate a cavity from about fourteen to about fifteen and one half inches in width; the adjacent three, four, four, three and four inch wide batt sections may be used to insulate a cavity from about sixteen to about seventeen and one half inches in width; the adjacent four, four, three, four and five inch wide batt sections may be used to insulate a cavity from about eighteen to about nineteen and one half inches in width; and the entire batt ,as a unit, may be used to insulate a cavity having a width from about twenty to about twenty-two and one half inches in width. It should also be noted that the pre-cut resilient fibrous insulation batt could be separated in the middle to form two eleven and one half inch batts.

For a faced or unfaced pre-cut resilient fibrous insulation batt of the present invention having a width between about ten and about twenty four inches, the insulation batt could have a first section with a width of about one and one half inches adjacent a first lateral edge; a second section with a width of about two and one half inches adjacent the second lateral edge; and a series of sections with two inch widths intermediate the two lateral edge sections. With sections of these widths, resilient insulation batts of different widths can be formed from a smallest width of about one and one half inches up to a greater selected width about one and one half inches less than the original width of the pre-cut resilient fibrous insulation batt in a series of selected width increments of about one inch, e.g. a ten inch wide batt (1½, 2, 2, 2, 2½); a sixteen inch wide batt (1½, 2, 2, 2, 2, 2, 2, 2½); or a twenty four inch wide batt (1½, 2, 2, 2, 2, 2, 2, 2, 2, 2, 2½). It is also contemplated that for a faced or unfaced pre-cut resilient fibrous insulation batt of the present invention having a width between about nine and about twenty five inches, the insulation batt could have a first section with a width of about one inch adjacent a first lateral edge; a second section with a width of about two inches adjacent the second lateral edge; and a series of sections with two inch widths intermediate the two lateral edge sections. With sections of these widths, resilient insulation batts of different widths can be formed from a smallest width of about one inch up to a greater selected width about one inch less than the original width of the pre-cut resilient fibrous insulation batt in a series of selected width increments of about one inch, e.g. a ten inch wide batt (1, 2, 2, 2, 2, 2); a fifteen inch wide batt (1, 2, 2, 2, 2, 2, 2, 2); or a twenty five inch wide batt (1, 2, 2, 2, 2, 2, 2, 2, 2, 2, 2, 2).

In addition to being used to insulate cavities up to two inches wide, two and one half inch batt sections of a pre-cut resilient fibrous insulation batt of the present invention can be pulled apart into layers and used for chinking around windows. Many homes use a 2×10-framing member for a header over a window or a door that is inset 1½ inches so that the cavity can be insulated. A ten and one half inch wide batt section can be turned sideways to insulate the header. As discussed above, preferably, the widths of the batt sections are selected so that with one tear or separation of a batt section or different combinations of adjacent batt sections from the remainder of a pre-cut resilient fibrous insulation batt, batts of different widths can be formed from a pre-cut resilient fibrous insulation batt with the widths of the batts formed ranging from the narrowest (having a width of about two and one half to three and one half inches wide) up to the widest, which is the full width of the pre-cut fibrous insulation batt, in increments of about two inches or less. At a job site, insulation installers generally custom cut previously uncut insulation batts, to fit nonstandard width cavities, about one to about one and one half inches wider than the cavity. With the ability to form batts from the pre-cut resilient fibrous insulation batts of the present invention in about two inch increments from the narrowest width up to the standard width, most cavities can be insulated with the pre-cut resilient fibrous insulation batts or integral batts of lesser widths formed from the pre-cut resilient fibrous insulation batts with the batts being about one half to about two inches wider than the cavity width. Typically, it is desirable to keep the compression of the batts to about two inches or less as compressing the batts more than two inches in width may lead to a bulging of the batt in certain applications. Other batt section configurations for twenty-three inch wide batts include pre-cut fibrous insulation batts with batt sections widths of about: two, four, one and one half, three and one half, four, and four inches (2-4-1.5-3.5-4-4 inches); eleven and one half, two, two, two, two, and three and one half inches (11.5-2-2-2-2-3.5 inches); two and one half, four, four, four, four, and four and one half inches (2.5-4-4-4-4-4.5 inches); two and one half, four, five, three, four, and four and one half inches (2.5-4-5-3-4-4.5 inches); two and one half, four and one half, four and one half, two and one half, four and one half, and four and one half inches (2.5-4.5-4.5-2.5-4.5-4.5 inches); three and one half, four, four, two, four and five and one half inches (3.5-4-4-2-4-5.5 inches); six and one half, four, four, and eight and one half inches (6.5-4-4-8.5 inches); and seven and one half, four, four, and seven and one half inches (7.5-4-4-7.5 inches).

The thicknesses of the unfaced and faced, uncut and pre-cut resilient fibrous insulation batts of the present invention are determined by the amount of thermal resistance or sound control desired and the depth of the cavities being insulated. Typically, the uncut and pre-cut resilient fibrous insulation batts are about three to about ten or more inches in thickness and approximate the depth of the cavities being insulated. For example, in a wall cavity defined in part by nominally 2×4 or 2×6 inch studs or framing members, a pre-cut fibrous insulation batt will have a thickness of about 3½ inches or about 5½ inches, respectively.

Figure 10:
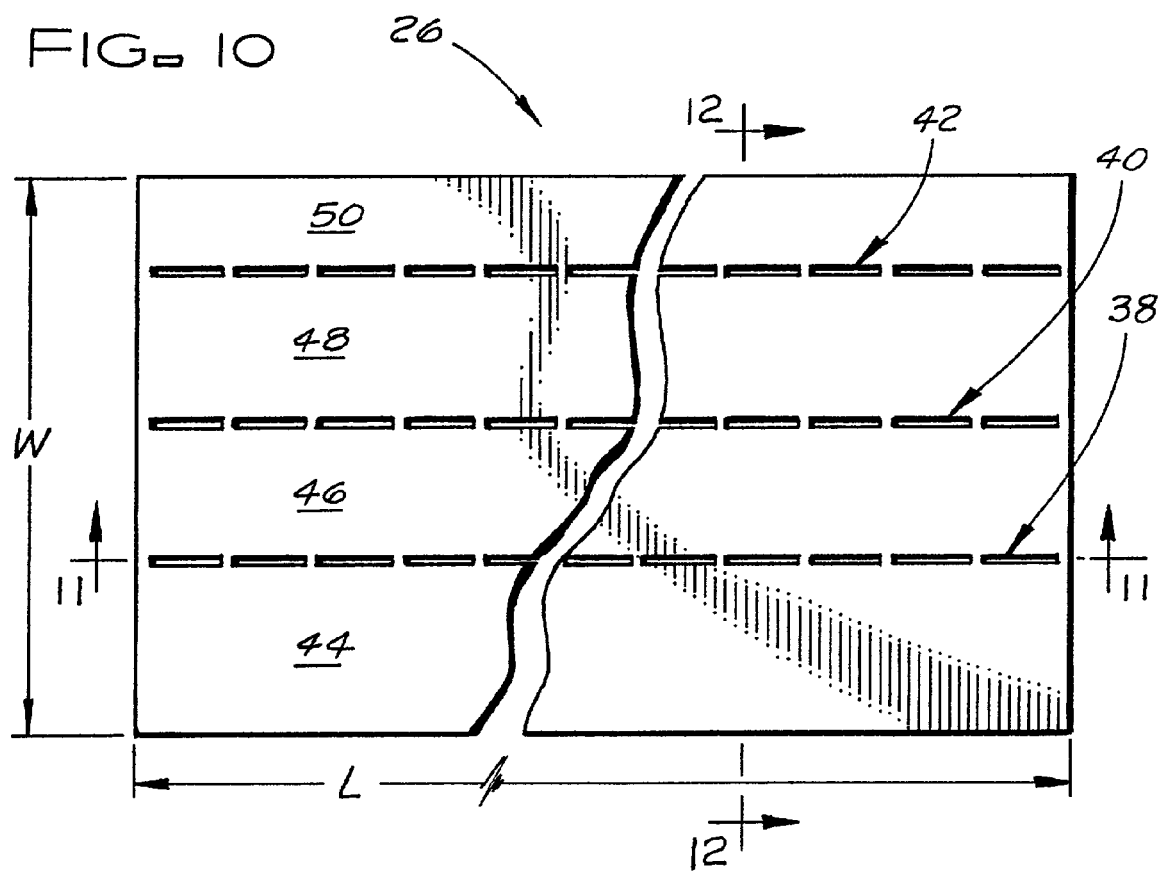
FIG. 10 is a schematic view of a major surface of an unfaced pre-cut resilient fibrous insulation batt of the present invention having four sections.
Figure 11:
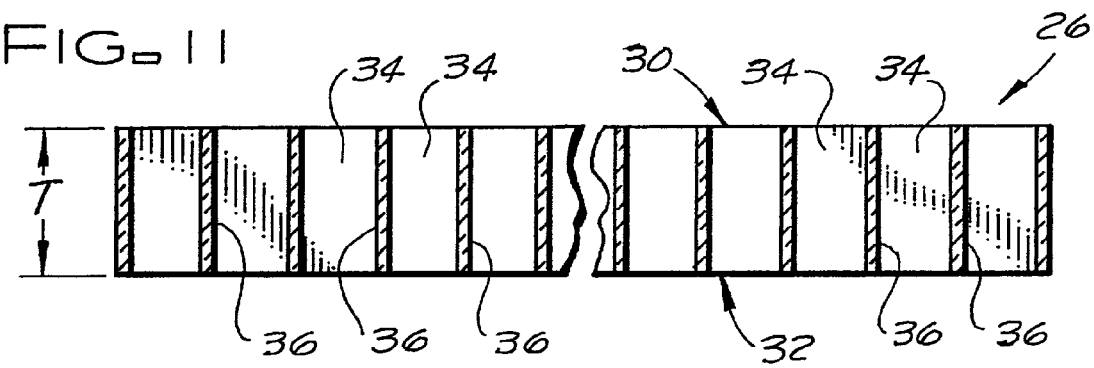
FIG. 11 is a schematic longitudinal cross section of the unfaced pre-cut resilient fibrous insulation batt of FIG. 10, taken substantially along lines 11—11 of FIG. 10.
Figure 12:
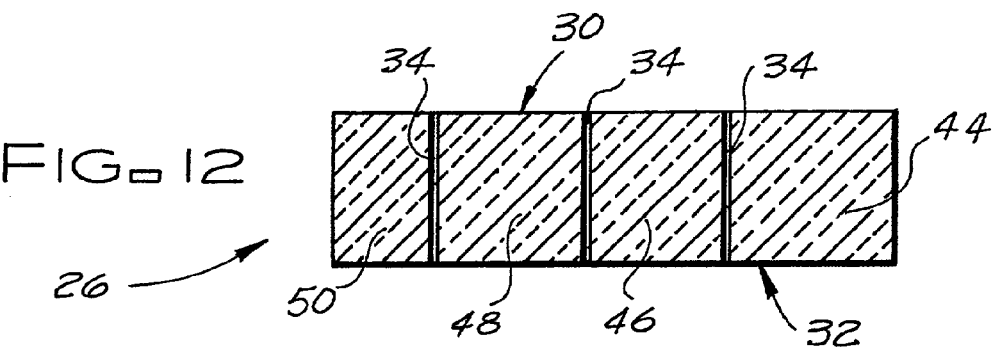
FIG. 12 is a schematic transverse cross section of the unfaced pre-cut resilient fibrous insulation batt of FIG. 10, taken substantially along lines 12—12 of FIG. 10.

FIGS. 10 to 12 show an unfaced embodiment of the pre-cut resilient fibrous insulation batt 26 of the present invention. The pre-cut resilient fibrous insulation batt has a length "L", a width "W" and a thickness "T". A first major surface 30 and a second major surface 32 of the pre-cut resilient fibrous insulation batt are each defined by the width "W" and the length "L" of the insulation batt. There are one or more series of cuts 34 and separable connectors 36, preferably three or more series of cuts and separable connectors (three series 38, 40 and 42 of cuts 34 and separable connectors 36 are shown) which extend for the length of the pre-cut resilient fibrous insulation batt 26. Each series of cuts 34 and separable connectors 36 divide the pre-cut resilient fibrous insulation batt into batt sections with the pre-cut resilient fibrous insulation batt being divided lengthwise into, preferably, four or more batt sections (four batt sections 44, 46, 48 and 50 are shown) extending the length of the pre-cut resilient fibrous insulation batt.

Each of the cuts 34 in each series of cuts and separable connectors 38, 40 and 42 extends from the first major surface 30 to the second major surface 32 of the pre-cut fibrous insulation batt and is separated from preceding and succeeding cuts 34 in its series of cuts and separable connectors by the separable connectors 36. Each of the separable connectors 36 in each series of cuts and separable connectors 38, 40 and 42 may extend from the first major surface 30 to the second major surface 32 of the pre-cut fibrous insulation batt and is separated from preceding and succeeding separable connectors 36 in its series of cuts and separable connectors by the cuts 34. While each of the separable connectors 36 may extend from the first major surface 30 to the second major surface 32 of the pre-cut fibrous insulation batt 26 as schematically shown in FIGS. 9 and 10, and, preferably, has a height greater than one half the thickness "T" of the pre-cut fibrous insulation batt, the connectors 36 may have a height less than one half the thickness of "T" of the pre-cut fibrous insulation batts. As an example of separable connectors that do not extend from the first major surface 30 to the second major surface 32 of the batt, the separable connectors 36 might terminate short (e.g. about ⅛ of an inch to about ½ of an inch short) or either or both of the major surfaces 30 and 32. The lengths of the cuts 34 used and the heights and/or lengths of the separable connectors 36 used may vary with the integrity of the pre-cut fibrous insulation batt with the cuts being shorter and/or the separable connectors being greater in height and/or length for insulation batts with less integrity.

The fibers of the compressible and resilient fibrous insulation batts typically used for both the uncut and the pre-cut fibrous insulation batts, e.g. glass fiber insulation batts, are randomly oriented with respect to each other, but due to the manner in which the fibers are collected to form the batt, the fibers tend to lie predominately in layers or planes generally parallel to the major surfaces of the batt. Thus, adjacent a major surface of the batt, the batt may tend to separate more easily along these layers than in a direction perpendicular to the layers when being pulled apart along a series of cuts and separable connectors. By having the separable connectors 36 terminating short of one or both of the major surfaces 30 and 32 of the pre-cut fibrous insulation batt, there may be less of a tendency for the pre-cut resilient fibrous insulation batt to partially delaminate adjacent a major surface of the batt along and adjacent a series of cuts and separable connectors when the batt is being separated at a series of cuts and separable connectors.

The relative lengths of the cuts 34 and the separable connectors 36 are selected to ensure that the pre-cut resilient fibrous insulation batt retains the required integrity for handling and to also ensure that the insulation batt can be easily separated by hand at any of the series of cuts and separable connectors 38, 40 and 42 in the pre-cut fibrous insulation batt. Generally, the cuts 34 are each about 1 to about 5 inches long and the separable connectors 36 are each about ⅛ to about ½ of an inch long. For example, a typical series of cuts and separable connectors may have cuts about 1 to about 1½ inches long and separable connectors about 3/16 to about ¼ of an inch long. The width of the cuts forming the separable connectors 36 in both the faced and the unfaced embodiments of the pre-cut resilient fibrous insulation batt of the present invention is typically about four thousands of an inch wide when cut by a water jet or about one hundredth of an inch or less when cut with a compression cutter. The cuts 34 are formed in the pre-cut resilient fibrous insulation batt 26 so that the resilience of the batt causes the cuts 34 in the pre-cut resilient fibrous insulation batt to close after the cuts are made in the blanket.

With the separable connectors 36 of each series of cuts and separable connectors 38, 40 and 42 joining the adjacent batt sections 44, 46, 48 and 50 of the pre-cut fibrous insulation batt together, the pre-cut resilient fibrous insulation batt can be handled as a unit for insulating a cavity having a width about equal to the preselected width of the batt, e.g. typically, a cavity about ½ of an inch to about 2 to 2½ inches less in width, or easily separated or torn apart by hand at one or more of the series of cuts and separable connectors 38, 40 and 42 formed by the cuts 34 and the separable connectors 36 (separated without the need to use a knife or other cutting tool) into one or more integral batt sections 44, 46, 48, and/or 50 for insulating a cavity having a lesser width, such as a cavity having a width more than two inches less than a standard width of fourteen and one half or twenty-two and one half inches).

Preferably, for a faced embodiment of the pre-cut resilient fibrous insulation batt of the present invention, the facing or facing sheet of the faced pre-cut fibrous insulation batt 126 is made of kraft paper, a foil-scrim-kraft paper laminate, a foil-kraft laminate, polymeric film-scrim-kraft laminate, a fabric, or a polymeric film, such as but not limited to polyethylene, and is bonded to a major surface of the pre-cut fibrous insulation batt by a bonding agent. Preferably, the bonding agent for Kraft paper or foil-scrim-Kraft paper facings is an asphalt or other bituminous material that can be coated onto or otherwise applied to one side of the facing sheet just prior to applying the facing sheet to the major surface of the pre-cut resilient fibrous insulation batt and the bonding agent for the polymeric film facing is a commercially available pressure sensitive adhesive that can be coated onto or otherwise applied to one side of the facing sheet just prior to applying the facing sheet to a major surface of the pre-cut resilient fibrous insulation batt.

Figure 13:
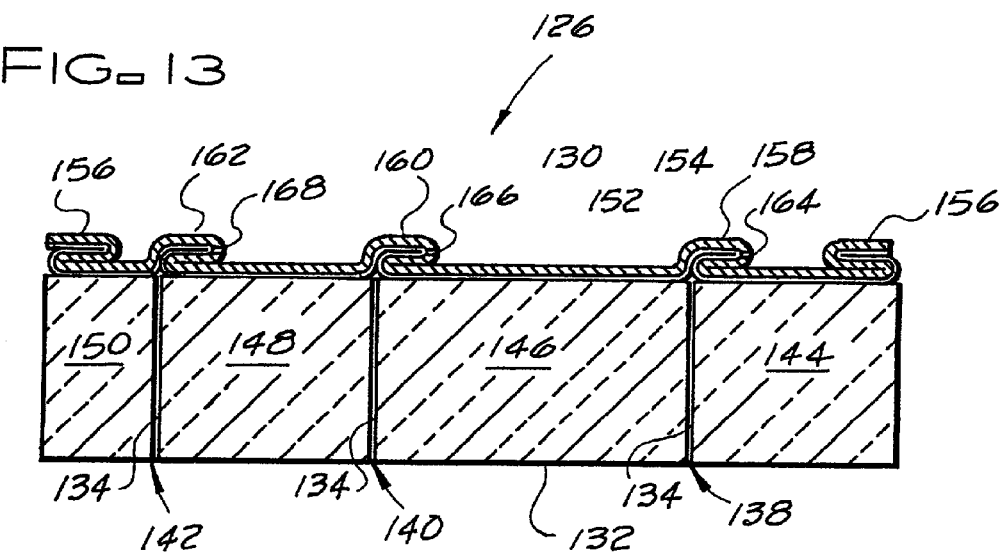
FIG. 13 is a schematic transverse cross section of a faced pre-cut resilient fibrous insulation batt of the present invention having separable connectors such as those shown in FIGS. 10 to 12.
Figure 14:
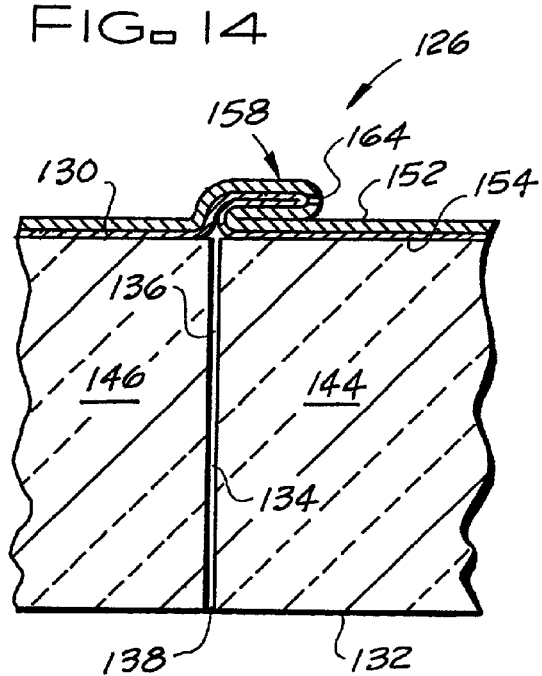
FIGS. 14 and 15 are partial schematic transverse cross sections through the faced pre-cut resilient fibrous insulation batt of FIG. 13 to show adjacent sections of the pre-cut resilient fibrous insulation batt being separated.
Figure 15:
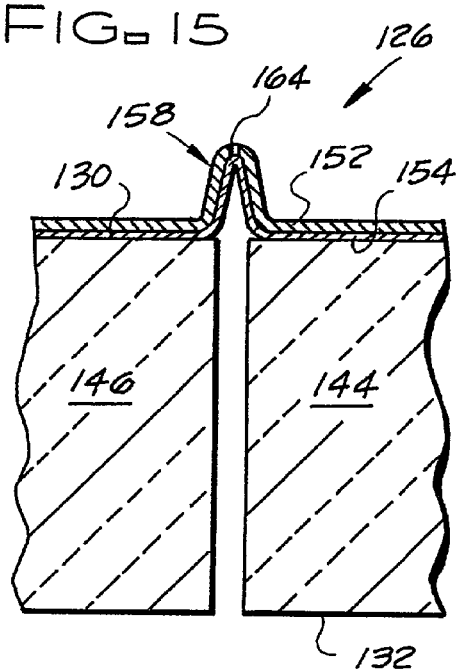

FIGS. 13 to 15 show an embodiment 126 of the faced pre-cut resilient fibrous insulation batt of the present invention. As shown, the faced pre-cut resilient fibrous insulation batt 126 has a first major surface 130 and a second major surface 132. There are one or more series of cuts 134 and separable connectors 136, preferably three or more series of cuts and separable connectors (three series 138, 140 and 142 of cuts 134 and separable connectors 136 are shown) in the faced pre-cut resilient fibrous insulation batt 126 that extend for the length of the faced pre-cut resilient fibrous insulation batt. Each series of cuts 134 and separable connectors 134 divide the faced pre-cut resilient fibrous insulation batt into batt sections with the faced pre-cut resilient fibrous insulation batt 126 being divided lengthwise into two or more batt sections and, preferably, four or more batt sections (four batt sections 144, 146, 148 and 150 are shown) extending the length of the faced pre-cut resilient fibrous insulation batt.

Each of the cuts 134 in each series of cuts and separable connectors 138, 140 and 142 extends from the first major surface 130 to the second major surface 132 of the pre-cut fibrous insulation batt and is separated from preceding and succeeding cuts 134 in its series of cuts and separable connectors by separable connectors 136. Each of the separable connectors 136 in each series of cuts and separable connectors 138, 140 and 142 may extend from the first major surface 130 to the second major surface 132 of the pre-cut resilient fibrous insulation batt and is separated from preceding and succeeding separable connectors 136 in its series of cuts and separable connectors by cuts 134. While each of the separable connectors 136 may extend from the first major surface 130 to the second major surface 132 of the pre-cut resilient fibrous insulation batt 126 as schematically shown in FIGS. 11 and 12, and, preferably, has a height greater than one half the thickness "T" of the pre-cut resilient fibrous insulation batt, the connectors 136 may have a height less than one half the thickness of "T" of the pre-cut resilient fibrous insulation batts. As an example of separable connectors that do not extend from the first major surface 130 to the second major surface 132 of the batt, the separable connectors 136 might terminate short (e.g. about ⅛ of an inch to about ½ of an inch short) or either or both of the major surfaces 130 and 132. The lengths of the cuts 134 used and the heights and/or lengths of the separable connectors 136 used may vary with the integrity of the pre-cut resilient fibrous insulation batt with the cuts being shorter and/or the separable connectors being greater in height and/or length for insulation batts with less integrity.

The relative lengths of the cuts 134 and the separable connectors 136 are selected to ensure that the faced pre-cut resilient fibrous insulation batt retains the required integrity for handling and to also ensure that the insulation batt can be easily separated by hand at any of the series of cuts and separable connectors 138, 140 and 142 in the pre-cut resilient fibrous insulation batt. Generally, the cuts 134 are each about 1 to about 5 inches long and the separable connectors 136 are each about ⅛ to about ½ of an inch long. For example, a typical series of cuts and separable connectors may have cuts about 1 to about 1½ inches long and separable connectors about 3/16 to about ¼ of an inch long.

The width of the cuts 134 forming the separable connectors 136 in both the faced and the unfaced embodiments of the pre-cut resilient fibrous insulation batt of the present invention is typically about four thousands of an inch wide when cut by a water jet and about one hundredth of an inch or less when cut with a compression cutter. The cuts 134 are formed in the pre-cut resilient fibrous insulation batt so that the resilience of the batt causes the cuts 134 in the pre-cut resilient fibrous insulation batt 126 to close after the cuts are made in the blanket.

The facing or facing sheet 152 typically overlies either the entire first major surface 130 or second major surface 132 of the pre-cut resilient fibrous insulation batt 126 and is secured by a bonding agent 154 to the major surface of the pre-cut resilient fibrous insulation batt that it overlies. As shown in FIG. 11, the facing sheet 152 has lateral tabs 156 and pairs of tabs 158, 160, and 162 adjacent each series of cuts and separable connectors 138, 140 and 142 in the faced pre-cut resilient fibrous insulation batt 126 for stapling or otherwise securing the faced pre-cut resilient fibrous insulation baff or section(s) of the faced pre-cut resilient fibrous insulation batt to framing members. The lateral tabs 156, which are preferably formed by Z-shaped pleats in the facing sheet 152, extend for the length of the faced pre-cut resilient fibrous insulation batt 126 and the pairs of tabs 158, 160 and 162 are longitudinally aligned with and extend for the lengths of the series of cuts and separable connectors 138, 140 and 142 of the faced pre-cut resilient fibrous insulation batt 126. Preferably, each pair of tabs 158, 160 and 162 is formed by a Z-shaped pleat in the facing sheet with the tabs of each pair of tabs 158, 160 and 162 being separably connected to each other by perforated lines 164, 166 and 168 respectively, so that the facing can be separated at each series of cuts and separable connectors. With this structure, the faced pre-cut resilient fibrous insulation batt 126, with the facing sheet 152, can be handled as a unit for insulating a cavity having a width about equal to the preselected width of the faced pre-cut resilient fibrous insulation batt or easily separated or torn apart by hand into one or more integral batt sections by separating or tearing apart the faced pre-cut resilient fibrous insulation batt 126 at one of the series of cuts and separable connectors e.g. series 138 as shown in FIGS. 14 and 15, and one of the perforated lines in the facing sheet 152, e.g. perforated line 164 as shown in FIGS. 12 and 13, for insulating a cavity having a lesser cavity width, e.g. less than a standard cavity width.

The spaced apart perforations of the perforated lines 164, 166 and 168 may be of various shapes, including but not limited to, round, oval, elongated, slit shaped, etc. and the spacing between perforations and the length of the perforations may vary as long as the facing is easily separated by hand along the line formed by the perforations. Preferably, the perforations of the perforated lines 164, 166 and 168 in the embodiment of FIGS. 13 to 15, are filled, e.g. with the bonding agent 154 that bonds the facing sheet 152 to one of the major surfaces of the faced pre-cut resilient fibrous insulation batt or a similar material, to close the perforations so that the facing sheet 12 functions as a vapor barrier. While, perforations are preferred, tear strings could be used with or substituted for the perforated lines 164, 166 and 168. The tear strings would have a free end for gripping; be bonded to the facing sheet by the bonding agent 154; and would extend along lines that coincide with the locations of the perforated lines 164, 166 and 168.

The use of pairs of tabs 158, 160 and 162 formed by Z-shaped pleats in the facing sheet 152 wherein the tabs of each pair of tabs are separably bonded together by the bonding agent 154 bonding the facing sheet 152 to a major surface of the faced pre-cut fibrous insulation batt provides several advantages. The overlapping and bonding together of the tabs across their widths in each pair of tabs with the perforations of the perforated lines at the juncture of the tabs improves the vapor barrier properties of the perforated facings. There is less of a tendency for the facing sheet 152 to split during installation of the batt because the bonding agent 154 joining the tabs of each pair of tabs together can yield when the faced pre-cut resilient fibrous insulation batt is flexed. Locating the perforations along folds in the Z-shaped pleated, facilitates the tearing of the facing sheet 152 along the perforated lines and helps to prevent the propagation of the tears out of the tabs. As shown in FIG. 13, as the batt sections adjacent a pair of tabs are separated, the tabs, which initially lie on a major surface of the batt, are pulled away from the major surface of the batt to extend generally perpendicular to the major surface of the batt for better grasping by a worker as the tabs peel away from each other and finally separate from each other along the perforated line. In addition, the use of a facing with tabs adjacent each series of cuts and separable connectors between batt sections, in this and other faced embodiments of the pre-cut resilient fibrous insulation batt, not only provides tabs for securing the batt sections in place, but also enables the facings to provide vapor barriers across the entire width of the batt sections even when the means for separating the facing along each series of cuts and separable connectors, e.g. perforated lines, are not properly aligned with each series of cuts and separable connectors.

The integral tabs adjacent each series of cuts and separable connectors plus lateral tabs, such as the lateral tabs 156 shown in FIG. 11, can be used to secure the faced pre-cut resilient fibrous insulation batts 126 or blanket sections of the faced pre-cut resilient fibrous insulation batt 126 to framing members by stapling or other conventional means, either as a unit or as one or more batt sections when one or more integral batt sections are separated from the remainder of the pre-cut resilient fibrous insulation batt. Preferably, the tabs are about one half to about one and one half inches in width. When securing the faced pre-cut resilient fibrous insulation batt 126 or one or more batt sections of the faced pre-cut resilient fibrous insulation batt to framing members, the tabs adjacent the series of cuts and separable connectors and the lateral tabs used to secure the batt in place are at least partially unfolded and extended outward from the faced pre-cut resilient fibrous insulation batt or batt sections of the faced pre-cut resilient fibrous insulation batt prior to stapling or otherwise securing the tabs to the framing members.

While the separable connectors, which can be separated by hand without the need to use a cutting tool, and the facing of FIGS. 10 to 15 are preferred, other separable connectors which can be separated by hand without the need to use a cutting tool and facings may be used in the resilient pre-cut fibrous insulation batt of the present invention. For example, as shown in FIGS. 2 to 6 of U.S. Pat. No. 6,083,594, the separable connectors between batt sections may be formed along a major surface of the batt by longitudinal cuts passing part of the way through the batt from the opposite major surface of the batt and leaving a portion of the batt uncut adjacent the major surface to form the separable connectors. While not preferred, facings without tabs intermediate the batt sections may be used such as the facing of FIGS. 4 to 6 of U.S. Pat. No. 6,083,594, the disclosure of which is incorporated herein in its entirety by reference. Separable connectors, extending the length of the batt, can also be formed by cutting the batt longitudinally along both major surfaces of the batt to form pairs of laterally aligned or substantially aligned cuts extending inward from each major surface of the batt that leave a portion of the batt intermediate the cuts and the major surfaces of the batt uncut to form separable connectors. Separable connectors may also be formed by longitudinally cutting a resilient, fibrous insulation batt into separate batt sections and, subsequently, separably connecting the separate batt sections together with an adhesive or bonding agent to form a batt of separable batt sections. A batt with separable batt sections may also be formed by longitudinally cutting a resilient fibrous insulation batt into separate batt sections and, subsequently, separably connecting the separate batt sections together with sheets overlaying one or both major surfaces of the batt sections and bonded to the batt sections or strips overlaying the cuts between the batt sections and bonded to the major surfaces of the batt sections adjacent the cuts. The sheets would have a tear strength, at the cuts in the batt between adjacent batt sections, either through a low tear strength of the sheet material or through the provision of perforated lines in the sheet material along the cuts, that would permit the batt sections to be separated from each other along the cuts in the batt without the need to use a cutting tool. Other facings that could be used including facings made up of a series of sheets that have overlapping lateral edge portions extending the length of the batt with the overlapping edge portions of successive sheets, overlapping at the longitudinally extending separable connectors joining adjacent batt sections of the pre-cut fibrous insulation batt together, to form pairs of overlapping tabs at the separable connectors.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An insulation package comprising:
   a plurality of resilient fibrous insulation batts in a stack; each of the resilient fibrous insulation batts having a length, a width and a thickness; each of the resilient fibrous insulation batts having a first major surface and a second major surface; the resilient fibrous insulation batts including uncut fibrous insulation batts and pre-cut fibrous insulation batts;
   each of the pre-cut fibrous insulation batts having a plurality of longitudinally extending batt sections formed in the pre-cut fibrous insulation batt by a plurality of longitudinally extending cut means spaced inwardly from lateral edges of the pre-cut fibrous insulation batt and located intermediate the batt sections of the pre-cut fibrous insulation batt; each of the cut means being closed to prevent a formation of thermal bridges in the direction of the thickness of the pre-cut fibrous insulation batt; the batt sections being separably joined to adjacent batt sections by separable connector means, extending along the length of the pre-cut fibrous insulation batt, for holding the pre-cut fibrous insulation butt together for handling; and each of the separable connector means being separable by hand to separate adjacent batt sections from each other whereby the pre-cut fibrous insulation batt can be handled as a unit for insulating a cavity having a width about equal to the width of the pre-cut fibrous insulation batt or separated by hand into batt sections at one or more of the separable connector means for insulating a cavity having a lesser width;
   between 20% and 70% of the stack of resilient fibrous insulation batts being the pre-cut fibrous insulation batts; between 30% and 80% of the stack of resilient fibrous insulation batts being the uncut fibrous insulation batts;
   the stack of resilient fibrous insulation batts being compressed in a direction perpendicular to the major surfaces of the insulation batts; and
   the stack of resilient fibrous insulation batts being enveloped within a covering to form a package containing the resilient fibrous insulation batts that includes between 20% and 70% of the pre-cut fibrous insulation batts and between 30% and 80% of the uncut fibrous insulation batts.

2. The insulation package according to claim 1, wherein:
   each of the resilient fibrous insulation batts is between about 10 inches and 24 inches in width; and successive batt sections of the batt sections of each of the pre-cut fibrous insulation batts have widths such that, by separating at least one of the batt sections from the pre-cut fibrous insulation batt, an integral batt can be formed having any of a series of selected widths that range from a width of about 1½ to 3 inches to a greater width less than the width of the pre-cut fibrous insulation batt and that differ in width in increments that are between about 1 inch and about 4 inches in width.

3. The insulation package according to claim 2, wherein:
   each of the resilient fibrous insulation batts is about 15 inches in width; and the successive batt sections of the batt sections of each of the pre-cut fibrous insulation batts have widths of about 2½, 4, 4, and 4½ inches.

4. The insulation package according to claim 2, wherein:
   each of the resilient fibrous insulation batts is about 23 inches in width; and the successive batt sections of the batt sections of each of the pre-cut fibrous insulation batts have widths of about 3½, 4, 4, and 4½ inches.

5. The insulation package according to claim 2, wherein:
   each of the resilient fibrous insulation batts is about 23 inches in width; and the successive batt sections of the batt sections of each of the pre-cut fibrous insulation batts have widths of about 3, 4, 4, 3, 4 and 5 inches.

6. The insulation package according to claim 2, wherein:
   each of the resilient fibrous insulation batts is a resilient glass fiber insulation batt; the density of each of the resilient fibrous insulation batts is between about 0.4 pounds/ft$^3$ and about 1.5 pounds/ft$^3$; the length of each of the resilient fibrous insulation batts is at least 46 inches; the thickness of each of the fibrous insulation batts is at least 3 inches.

7. The insulation package according to claim 1, wherein:
   a facing sheet overlies and is bonded to the first major surface of each of the resilient fibrous insulation batts; and each of the facing sheets overlying and bonded to one of the pre-cut fibrous insulation batts has a separable means therein extending for the length of the pre-cut fibrous insulation batt for permitting the facing sheet to be separated by hand along the length of the separable connector means of the pre-cut fibrous insulation batt whereby the pre-cut fibrous insulation batt with the facing sheet can be handled as a unit for insulating a cavity having a width about equal to the width of the pre-cut fibrous insulation batt or easily separated into sections by hand at one of the separable connector means of the pre-cut fibrous insulation batt and the separable means of the facing sheet for insulating a cavity having a width less than the width of the pre-cut fibrous insulation batt.

8. The insulation package according to claim 7, wherein: the separable means of each of the facing sheets bonded to one of the pre-cut fibrous insulation batts are perforated lines in the facing sheet.

9. The insulation package according to claim 8, wherein: perforations of each of the perforated lines of each of the facing sheets bonded to one pre-cut fibrous insulation batts are filled with a bonding agent that bonds the facing sheet to the first major surface of the pre-cut fibrous insulation batt to dose the perforations so that the facing sheet functions as a vapor barrier.

10. The insulation package according to claim 9, wherein: each of the facing sheets has a first pair of tabs, adjacent lateral edges of the first major surface of and extending along the length of the resilient fibrous insulation batt to which the facing sheet is bonded, for securing the resilient fibrous insulation batt to framing members; and each of the facing sheets bonded to one of the pre-cut fibrous insulation batts has additional pairs of tabs, at least substantially aligned with the separable connector means of and extending along the length of the pre-cut fibrous insulation batt to which the facing sheet is bonded, for securing the batt sections of the pre-cut fibrous insulation batt to framing members; and each tab of each the additional pairs of tabs is joined to the other of the pair of tabs by one of the perforated lines.

11. The insulation package according to claim 1, wherein: the separable connector means are formed in the pre-cut fibrous insulation batts by partial cuts in the pre-cut fibrous insulation batts, intermediate adjacent batt sections of the pre-cut fibrous insulation batt, that do not completely sever the batt between the adjacent batt sections; and the partial cuts are closed to prevent the formation of thermal bridges by the resilience of the precut fibrous insulation batt.

12. The insulation package according to claim 1, wherein: each of the cut means is a series of cuts passing from the first major surface to the second major surface of the pre-cut fibrous insulation batts; each of the separable connector means is a series of separable batt connectors separated and formed by the series of cuts; and the cuts are closed to prevent the formation of thermal bridges by the resilience of the pre-cut fibrous insulation batt.

13. The insulation package according to claim 12, wherein:

each of the resilient fibrous insulation batts is between about 10 inches and 24 inches in width; and successive ban sections of the batt sections of each of the pre-cut fibrous insulation batts have widths such that, by separating at least one of the batt sections from the pre-cut fibrous insulation bat, an integral batt can be formed having any of a series of selected widths that range from a width of about 1½ to 3 inches to a greater width less than the width of the pre-cut fibrous insulation batt and that differ in width in increments that are between about 1 inch and about 4 inches in width.

14. The insulation package according to claim 13, wherein:

each of the resilient fibrous insulation batts is a resilient glass fiber insulation batt; the density of each of the resilient fibrous insulation batts is between about 0.4 pounds/ft$^3$ and about 1.5 pounds/ft$^3$; the length of each of the resilient fibrous insulation batts is at least 46 inches; the thickness of each of the fibrous insulation batts is at least 3 inches.

15. The insulation package according to claim 13, wherein:

a facing sheet overlies and is bonded to the first major surface of each of the resilient fibrous insulation batts; and each of the facing sheets overlying and bonded to one of the pre-cut fibrous insulation batts has a separable means therein extending for the length of the pre-cut fibrous insulation batt for permitting the facing sheet to be separated by hand along the length of the separable connector means of the pre-cut fibrous insulation batt whereby the pre-cut fibrous insulation batt with the facing sheet can be handled as a unit for insulating a cavity having a width about equal to the width of the pre-cut fibrous insulation batt or easily separated into sections by hand at one of the separable connector means of the pre-cut fibrous insulation batt and the separable means of the facing sheet for insulating a cavity having a width less than the width of the pre-cut fibrous insulation batt.

16. The insulation package according to claim 13, wherein:

the successive batt sections have widths such that an integral batt can be formed having any of a series of selected widths that differ in width, predominately, in about 1 to about 2 inch increments.

17. A unitized insulation package comprising:

a plurality of insulation packages; means binding the plurality of insulation packages together as a unit; each of the insulation packages comprising a plurality of resilient fibrous insulation batts in a stack that is enveloped within a covering; each of the resilient fibrous insulation batts having a length, a width and a thickness; each of the resilient fibrous insulation batts having a first major surface and a second major surface; the resilient fibrous insulation batts contained in a first set of the insulation packages being uncut resilient fibrous insulation batts and the resilient fibrous insulation batts contained in a second set of the insulation packages being pre-cut resilient fibrous insulation batts;

each of the pre-cut fibrous insulation batts contained in the second set of the insulation packages having a plurality of longitudinally extending batt sections formed in the pre-cut fibrous insulation batt by a plurality of longitudinally extending cut means spaced inwardly from lateral edges of the fibrous insulation batt and located intermediate the batt sections of the fibrous insulation batt; each of the cut means being closed to prevent a formation of thermal bridges in the direction of the thickness of the fibrous insulation batt; the batt sections being separably joined to adjacent batt sections by separable connector means, extending along the length of the pre-cut fibrous insulation batt, for holding the pre-cut fibrous insulation batt together for handling; and the separable connector means being separable by hand to separate adjacent batt sections whereby the pre-cut fibrous insulation batt can be handled as a unit for insulating a cavity having a width about equal to the width of the pre-cut fibrous insulation batt or separated by hand into batt sections at one or more of the separable connector means for insulating a cavity having a lesser width; and the first set of insulation packages being between 30% and 80% of the insulation packages in the unit; and the second set of insulation packages being between 20% and 70% of the insulation packages in the unit.

18. The unitized insulation package according to claim 17, wherein:
each of the resilient fibrous insulation batts is between about 10 inches and 24 inches in width; and successive batt sections of the batt sections of each of the pre-cut fibrous insulation batts have widths such that, by separating at least one of the batt sections from the pre-cut fibrous insulation batt, an integral batt can be formed having any of a series of selected widths that range from a width of about 1½ to 3 inches to a greater width less than the width of the pre-cut fibrous insulation batt and that differ in width in increments that are between about 1 inch and about 4 inches in width.

19. The unitized insulation package according to claim 18, wherein:
each of the resilient fibrous insulation batts is about 15 inches in width; and the successive batt sections of the batt sections of each of the pre-cut fibrous insulation batts have widths of about 2½, 4, 4, and 4½ inches.

20. The insulation package according to claim 18, wherein:
each of the resilient fibrous insulation batts is about 23 inches in width; and the successive batt sections of the batt sections of each of the pre-cut fibrous insulation batts have widths of about 3½, 4, 4, and 11½ inches.

21. The unitized insulation package according to claim 18, wherein:
each of the resilient fibrous insulation batts is about 23 inches in width; and the successive batt sections of the batt sections of each of the pre-cut fibrous insulation batts have widths of about 3, 4, 4, 3, 4 and 5 inches.

22. The unitized insulation package according to claim 18, wherein:
each of the resilient fibrous insulation batts is a resilient glass fiber insulation batt; the density of each of the resilient fibrous insulation batts is between about 0.4 pounds/ft$^3$ and about 1.5 pounds/ft$^3$; the length of each of the resilient fibrous insulation batts is at least 46 inches; the thickness of each of the fibrous insulation batts is at least 3 inches.

23. The unitized insulation package according to claim 18, wherein:
a facing sheet overlies and is bonded to the first major surface of each of the resilient fibrous insulation batts; and each of the facing sheets overlying and bonded to one of the pre-cut fibrous insulation batts has a separable means therein extending for the length of the pre-cut fibrous insulation batt for permitting the facing sheet to be separated by hand along the length of the separable connector means of the pre-cut fibrous insulation batt whereby the pre-cut fibrous insulation batt with the facing sheet can be handled as a unit for insulating a cavity having a width about equal to the width of the pre-cut fibrous insulation batt or easily separated into sections by hand at one of the separable connector means of the pre-cut fibrous insulation batt and the separable means of the facing sheet for insulating a cavity having a width less than the width of the pre-cut fibrous insulation batt.

24. The unitized insulation package according to claim 23, wherein:
the separable means of each of the facing sheets bonded to one of the pre-cut fibrous insulation batts are perforated lines in the facing sheet.

25. The unitized insulation package according to claim 24, wherein:
perforations of each of the perforated lines of each of the facing sheets bonded to one pre-cut fibrous insulation batts are filled with a bonding agent that bonds the facing sheet to the first major surface of the pre-cut fibrous insulation batt to close the perforations so that the facing sheet functions as a vapor barrier.

26. The unitized insulation package according to claim 25, wherein:
each of the facing sheets has a first pair of tabs, adjacent lateral edges of the first major surface of and extending along the length of the resilient fibrous insulation batt to which the facing sheet is bonded, for securing the resilient fibrous insulation batt to framing members; and
each of the facing sheets bonded to one of the pre-cut fibrous insulation batts has additional pairs of tabs, at least substantially aligned with the separable connector means of and extending along the length of the pre-cut fibrous insulation batt to which the facing sheet is bonded, for securing the batt sections of the pre-cut fibrous insulation batt to framing members; and each tab of each the additional pairs of tabs is joined to the other of the pair of tabs by one of the perforated lines.

27. The unitized insulation package according to claim 17, wherein:
the separable connector means are formed in the pre-cut fibrous insulation batts by partial cuts in the pre-cut fibrous insulation batts intermediate adjacent batt sections of the pre-cut fibrous insulation batt and the partial cuts are closed to prevent the formation of thermal bridges by the resilience of the pre-cut fibrous insulation batt.

28. The unitized insulation package according to claim 17, wherein:
each of the cut means is a series of cuts passing from the first major surface to the second major surface of the pre-cut fibrous insulation batts; each of the separable connector means is a series of separable batt connectors separated and formed by the series of cuts; and the cuts are closed to prevent the formation of thermal bridges by the resilience of the pre-cut fibrous insulation batt.

29. The unitized insulation package according to claim 28, wherein:
each of the resilient fibrous insulation batts is between about 10 inches and 24 inches in width; and successive batt sections of the batt sections of each of the pre-cut fibrous insulation batts have widths such that, by separating at least one of the batt sections from the pre-cut fibrous insulation batt, an integral batt can be formed having any of a series of selected widths that range from a width of about 1½ to 3 inches to a greater width less than the width of the pre-cut fibrous insulation batt and that differ in width in increments that are between about 1 inch and about 4 inches in width.

30. The unitized insulation package according to claim 29, wherein:
each of the resilient fibrous insulation batts is a resilient glass fiber insulation batt; the density of each of the resilient fibrous insulation batts is between about 0.4 pounds/ft$^3$ and about 1.5 pounds/ft$^3$; the length of each of the resilient fibrous insulation batts is at least 46 inches; the thickness of each of the fibrous insulation batts is at least 3 inches.

31. The united insulation package according to claim 29, wherein:

a facing sheet overlies and is bonded to the first major surface of each of the resilient fibrous insulation batts; and each of the facing sheets overlying and bonded to one of the pre-cut fibrous insulation batts has a separable means therein extending for the length of the pre-cut fibrous insulation batt for permitting the facing sheet to be separated by hand along the length of the separable connector means of the pre-cut fibrous insulation batt whereby the pre-cut fibrous insulation batt with the facing sheet can be handled as a unit for insulating a cavity having a width about equal to the width of the pre-cut fibrous insulation batt or easily separated into sections by hand at one of the separable connector means of the pre-cut fibrous insulation batt and the separable means of the facing sheet for insulating a cavity having a width less than the width of the pre-cut fibrous insulation batt.

32. The unitized insulation package according to claim 29, wherein:

the successive batt sections have widths such that an integral batt can be formed having any of a series of selected widths that differ in width, predominately, in about 1 to about 2 inch increments.

\* \* \* \* \*